United States Patent [19]

Wagner

[11] 4,355,594
[45] Oct. 26, 1982

[54] LOADING DEVICE AND LOADING METHOD FOR HORSE TRAILERS AND THE LIKE

[76] Inventor: Mary H. Wagner, 1009 Forest Rd., Perkasie, Pa. 18944

[21] Appl. No.: 85,538

[22] Filed: Oct. 17, 1979

[51] Int. Cl.³ .............................................. B60P 3/04
[52] U.S. Cl. .................................... 119/7; 296/24 C; 49/33; 119/11
[58] Field of Search ............................. 119/7, 11, 15; 296/24 C; 49/33, 49

[56] References Cited

U.S. PATENT DOCUMENTS

| | | | |
|---|---|---|---|
| 69,022 | 9/1867 | Putnam | 119/27 |
| 474,251 | 5/1892 | Hindman | 119/27 |
| 596,023 | 12/1897 | Barrett | 119/15.5 A |
| 866,811 | 9/1907 | Riedemann | 119/15 |
| 1,209,688 | 12/1916 | Drew | 119/27 |
| 2,220,666 | 11/1940 | Murdock | 119/15 |
| 3,053,224 | 9/1962 | Pierce | 119/7 |
| 3,415,227 | 12/1968 | Welsh | 119/27 |
| 3,673,734 | 7/1972 | Goldberg | 49/49 X |

Primary Examiner—Robert Peshock
Assistant Examiner—Robert P. Swiatek

Attorney, Agent, or Firm—Morgan, Finnegan, Pine, Foley & Lee

[57] ABSTRACT

An arm member rotatably mounted to the back of a horse trailer is positioned in a vertically extending orientation to permit a person to lead a horse into the desired stall space on the trailer, and an elongate actuating member, which is adapted to retain the arm member in the vertical orientation and which is operable from a location remote of the arm member, is actuated to cause the arm member to move to a generally horizontal orientation behind the horse. In one embodiment, the arm member is pivotally mounted to the back end of the trailer and the actuating member comprises an elongate rod slidably mounted to the trailer and adapted to retain the arm member in the vertically upward orientation yet, when slidably moved forward, it releases the arm member and permits the arm to rotate under its own weight until its free end is caught by a stop member which holds the arm member horizontally. Alternatively, the actuating member comprises an elongate rod rotatably mounted to the trailer, with the arm member fixed to the back end of the rod. The front end of the rod includes a handle for controlling the orientation of the arm member which is thus rotatable between its vertical and horizontal orientations by acting directly on the handle.

17 Claims, 7 Drawing Figures

LOADING DEVICE AND LOADING METHOD FOR HORSE TRAILERS AND THE LIKE

BACKGROUND AND OBJECTS OF THE INVENTION

The present invention relates generally to horse transport devices and, more particularly, to certain improvements in horse trailers and the like and in methods for loading a horse onto such devices.

Horseback riding has maintained a consistently high level of popularity for sport and pleasure despite introduction of the automobile for everyday transportation. Riders often transport their horses over long distances either to participate in various equestrian competitions or simply for the enjoyment of riding through different environments. As a result, many types of devices have been developed for transporting horses, particularly horse trailers which can be hitched to the back of a car or other similar vehicle. One such trailer is disclosed in U.S. Pat. No. 3,053,224.

Most known horse transport devices, however, suffer one outstanding drawback—two people are required to load the horse safely onto the device, particularly on horse trailers. While one person leads the horse into the stall on the device, the second person must follow closely behind to position a guard chain or cable across the back of the stall, or raise the tailgate.

Horses are notorious for their fear of small confined areas and many will quickly try to escape unless restrained. Thus, when one person attempts to load a horse by himself, he runs the risk that the horse might back off the trailer before the person has a chance to run to the back of the trailer and set up the guard chain and/or tailgate. Even if the person ties the horse's halter at the front of the trailer, there is usually enough slack in the tie member to permit the horse to back up and either break the halter and escape or injure himself by pulling hard on the halter.

It is, therefore, an object of the present invention to provide a new and improved method and apparatus for loading and securing a horse onto a horse transport device. Another object is to provide a new and improved method and apparatus for loading a horse on a horse transport device, enabling one person to lead the horse onto the device and fasten the guard chain and/or the tailgate behind the horse to ensure it cannot escape.

It is also an object of the invention to provide new and improved method and apparatus for loading a horse onto a horse transport device, particularly a trailer, and thereafter safely securing the horse thereon. Another object of the invention is to provide new and improved method and apparatus for loading and securing a horse onto a horse transport device, which can be readily applied both to existing devices as well as to newly manufactured devices as original equipment.

It is also an object of the invention to provide new and improved method and apparatus for loading and securing a horse on a horse trailer, which can be conveniently carried out by one person.

It is another object of the invention to provide new and improved method and apparatus for loading and securing a horse onto a horse transport device, which is adapted to accommodate virtually any size horse.

In addition, it is an object of the invention to provide new and improved method and apparatus for loading and securing a horse onto a horse transport device, which is virtually free of any injury-causing structures.

Objects and advantages of the invention are set forth in part herein and in part will be appreciated herefrom or may be learned by practicing the invention, the same being realized and attained by means of the instrumentalities, steps and combinations pointed out in the appended claims. Accordingly, the invention resides in the novel parts, constructions, arrangements, steps, operations, combinations and improvements herein shown and described.

SUMMARY OF THE INVENTION

Briefly described, the improved loading method and apparatus according to the present invention includes the steps of and apparatus for causing an arm member which is rotatably mounted to the back of a horse transport device (such as a horse trailer) to move from a generally vertically extending orientation to a generally horizontally extending orientation behind the horse after it has been led onto the trailer. As preferably embodied, the orientation of the arm member is controllable from a location remote from the arm member.

In one embodiment, the arm member is retained in an upwardly vertically extending orientation by one end of an elongate actuating rod which is slidably mounted to the trailer. The rod is slidable from a rearward position, where it holds the arm member vertical, to a forward position for releasing the arm member thereby permitting it to rotate downwardly under its own weight. Advantageously, a handle member is formed at the front end of the rod for moving the rod and a stop member is positioned on the trailer to receive the free end of the arm member when released.

In an alternate embodiment, the rod is rotatably mounted to the trailer, with lever-like handle means affixed to its front end and the arm member is fixedly attached to the back end of the rod. The stop member is also positioned on the trailer to receive the free end of the arm member when rotated to a horizontal orientation.

It will be apparent from the foregoing general description that the objects of the invention specifically enumerated herein are achieved by the invention as herein embodied. Thus, it will be found that by the present invention, new and improved method and apparatus are provided for loading and receiving a horse on a horse transport device. It will be evident that the method and apparatus enable just one person to lead a horse onto the transport device and to secure the horse on the trailer without fear that the horse might back off the trailer before the person can complete the loading operation.

By providing a rotatable arm member at the back end of the trailer and a slidably mounted rod extending front-to-back with handle means at the front end, it will be found that one person can lead a horse onto a transport device while the arm is held in a vertically upwardly extending orientation. Without releasing his hold on the horse, the person can cause the arm member to rotate into a horizontal orientation, under its own weight, directly behind the horse to prevent the horse from backing off the transport device. Thereafter, the person can go to the back of the trailer to raise the tailgate and completely secure the horse.

Since the elongate actuating rod extends the length of the transport device, the handle means can be located at its front end where the person will be standing after leading the horse onto the trailer. Thus, by the method and apparatus of the invention, the person can cause the horse to be restrained from behind while he is standing at the front of the trailer by the horse's head.

By rotatably (instead of slidably) mounting the rod to the trailer and affixing the arm member to its back end, the arm member is not only positionable from a vertical to a horizontal orientation but also from the horizontal back to the vertical orientation. Thus, one person can also unload the horse by lowering the tailgate (or any guard chain) and moving to the front of the trailer adjacent the horse's head, where he can then rotate the arm member out of the horse's way to back the horse off the trailer.

In either embodiment, the arm member can be located at a suitable height from the floor of the trailer to restrain virtually any size horse. Moreover, the arm member can be formed in a rounded configuration or even padded to avoid risk of any injury to the horse.

It will be appreciated by those skilled in the art that the foregoing general description and the following detailed description are exemplary and explanatory of the invention but are not intended to be restrictive thereof.

The accompanying drawings, referred to herein and constituting a part hereof, illustrate preferred embodiments of the invention and, together with the description, serve to explain the principles of the invention.

BRIEF DESCRIPTION OF THE DRAWINGS

FIG. 7 is a sectional view through the wall of the trailer, showing a recess in the wall for receiving the rod of FIG. 5.

DETAILED DESCRIPTION OF PREFERRED EMBODIMENTS

Referring now to the embodiments of the invention illustrated in the accompanying drawings, there is shown in FIGS. 1-5 a horse trailer (indicated generally at 10) on which an embodiment of the invention has been installed. Although the trailer shown herein is a two-horse trailer (i.e., adapted to carry two horses), it will be understood that the invention can be adapted for use on single-horse trailers, horse vans or any other horse transport device where the horse is led into a stall-like space and then restrained from behind. Moreover, although the embodiments of the invention are shown mounted only to one wall portion, they are, of course, to be installed adjacent all the stall spaces on the transport device.

According to the invention, a bar-like restraining member, or arm member, 12 is pivotally mounted to the back of the trailer—here, to the back end edge of the trailer wall structure 14—for rotation in the vertical plane defined by the back end of the trailer, and, remotely operable actuating means are mounted to the wall in operative association with arm member 12 for controlling its orientation. Each arm member 12 preferably is about as long as the width of the stall space (indicated generally at 16) to which it corresponds.

Figure 1:
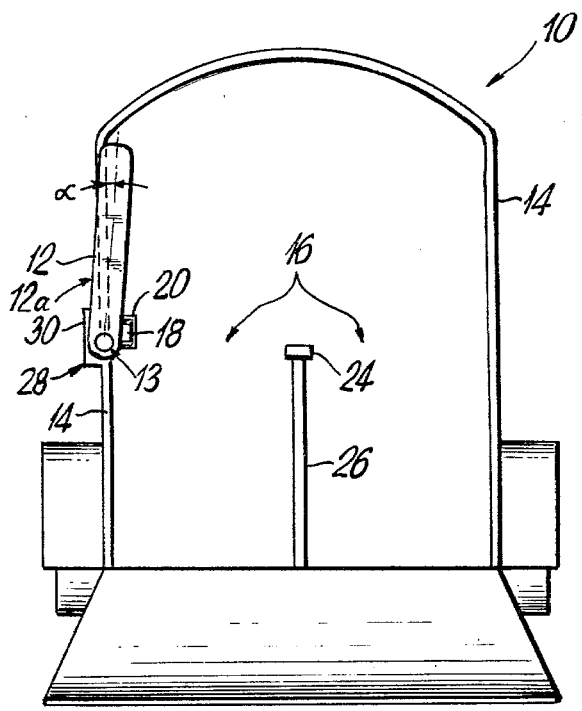
FIG. 1 is an elevation view of the back of a horse trailer on which an embodiment of the present invention has been installed and positioned in the pre-loading configuration.
Figure 2:
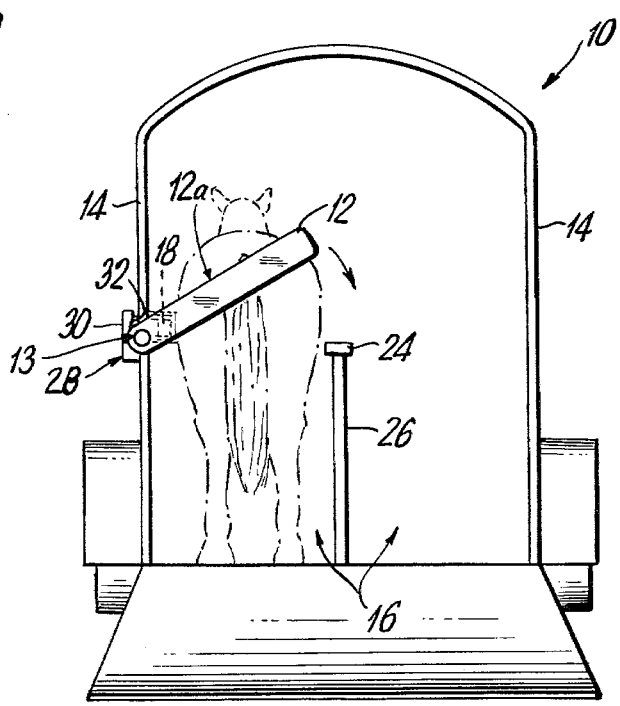
FIG. 2 is a view similar to FIG. 1 showing the invention during its operation.
Figure 3:
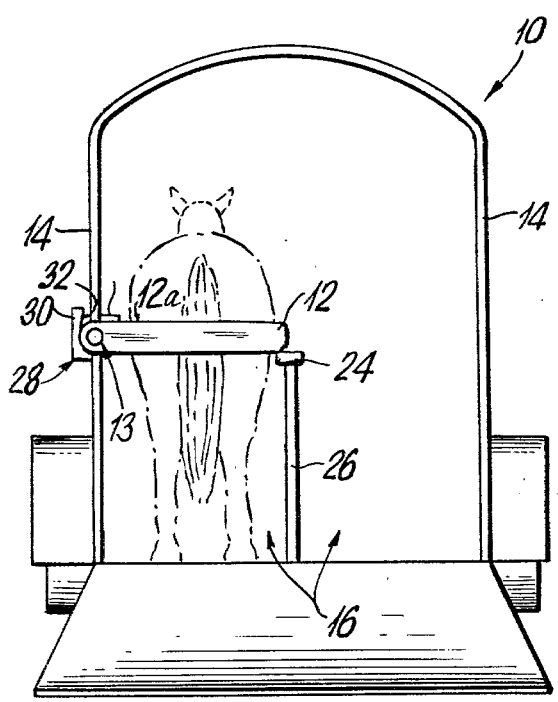
FIG. 3 is a view similar to FIG. 1 showing the invention when its operation has been completed.
Figure 4:
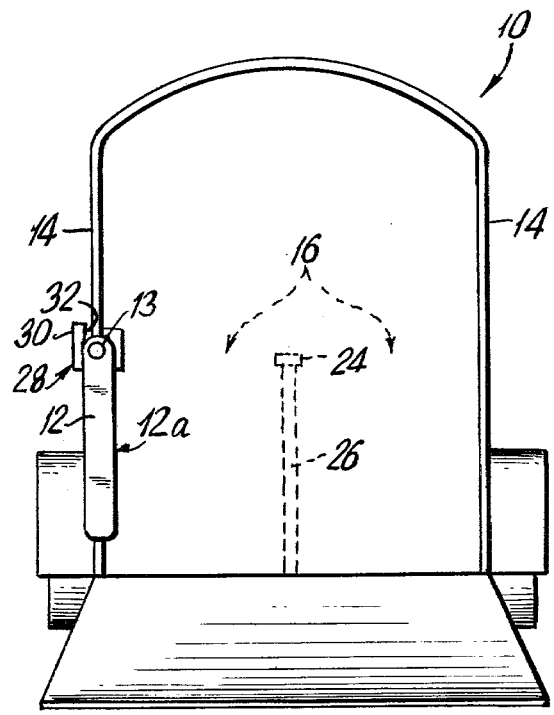
FIG. 4 is a view similar to FIG. 1 showing the invention when not in use.

In the first embodiment (FIGS. 1-5), the arm member 12 is pivotally mounted at one end directly to wall 14 by pivot/mounting structure 13 and the actuating means are adapted to retain the arm member in an upwardly extending vertical configuration (FIG. 1) yet, when desired, to release the arm member so that it can rotate (as indicated in FIG. 2) under its own weight until it is caught by a stop member and held in a horizontally extending orientation (FIG. 3).

FIG. 1 illustrates arm member 12 positioned ready for the loading operation. Arm 12 extends vertically upwardly to allow the horse (shown in phantom in FIGS. 2, 3 and 5) to be led onto trailer 10 in the usual way without any risk of injury due to the presence of the arm member. Once the horse has been led to the appropriate location on the device, the arm 12 is released so that it falls under its own weight to a horizontal orientation, as illustrated by the sequence indicated in FIGS. 2 and 3 and as explained more fully below.

FIG. 3 shows arm member 12 in its final loaded position, extending across the corresponding stall space at about the level of the horse's rump. To this end, bar member 12 is mounted (as determined by pivotal connection 13) about 40-44 (preferably 42) inches above the floor of trailer 10. Such positioning will ensure that the restraining arm is at about the level of the rump of most average-size horses, which range from about 12 hands to about 17 hands. If arm 12 is located too high, the horse may be able to maneuver its back under the arm and escape. Of course, where a horse of known size will always use the trailer, arm 12 may be set to coincide precisely with the middle of the horse's rump.

Figure 5:
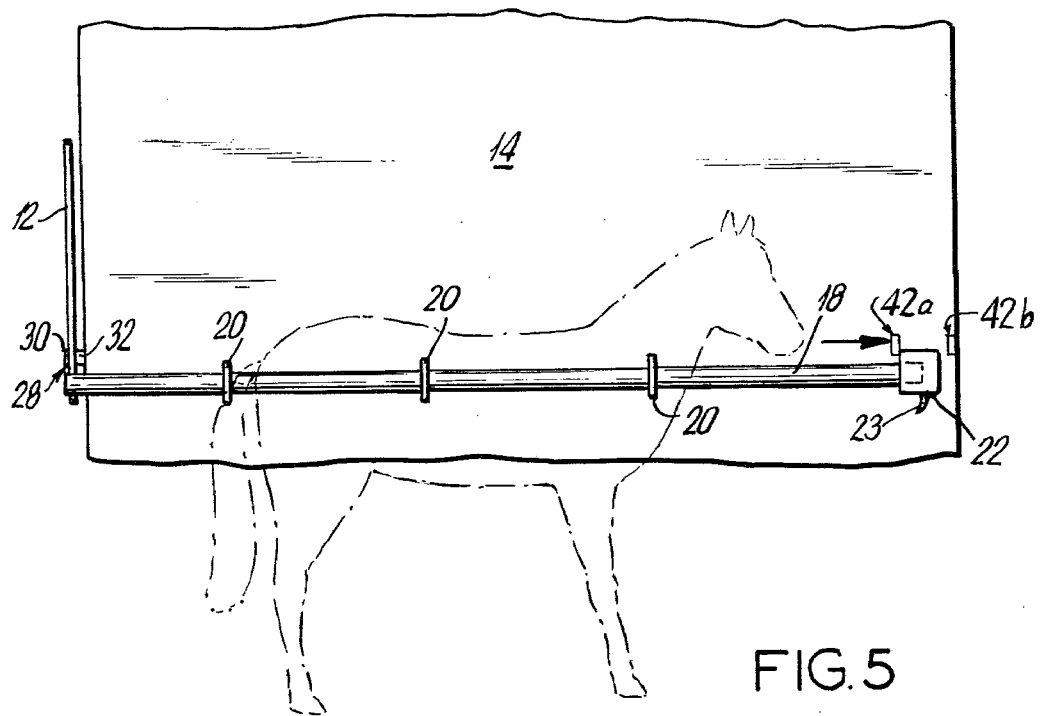
FIG. 5 is a side elevation of part of the trailer wall structure, showing one embodiment of the invention.

FIG. 5 illustrates the actuating means for use with the first embodiment of the invention. As here embodied, the actuating member comprises a relatively elongate rod member 18 which is slidably mounted to the wall structure 14, preferably to its inside surface as explained below. The length of rod 18 should be at least about as long as the distance from the back end of the trailer to a point about even with the anticipated location of the horse's head when loaded on the device (e.g., where the tie members are mounted to the wall for attachment to the horse's halter).

Rod 18 is mounted to the trailer wall structure by one or more slide supports 20 which are fixed to the wall to support rod 18 yet are adapted to permit slidable movement of rod 18 much like the belt loops on a pair of pants. To enable actual movement of rod 18, a handle or other grip (here in the form of trigger-like lever 22) is preferably attached to or formed at the front end of the rod. This will enable the person loading the horse to actuate arm member 12 from the front of the trailer with relative ease, as explained below. A similar trigger-like lever (23 in FIG. 5) is preferably formed at the back end of rod 18 for use in unloading the horse, as will be described in detail below.

Slide supports 20 are adapted to permit slidable excursion of actuating rod 18 from a first (or rearward) position where its back end edge is about co-planar with the back surface of restraining arm 12, to a second (or forward) position where its back end edge is completely in front of restraining arm 12. Thus when in its rearward position, rod 18 abuts the lower side edge of restraining arm 12 to hold it in the vertically upward orientation, as shown in FIG. 1. When actuating rod 18 is moved to the forward position, its back end no longer abuts arm member 12 and the arm member is free to swing downwardly under its own weight.

In operation, the trailer is readied for loading a horse by rotating retraining arm 12 to the vertical configuration and actuating rod 18 is moved to its rearward position so that arm 12 can rest against rod 18 (FIG. 1). The person simply leads the horse onto trailer 10 in the usual way. However, either before or after securing the horse (by cross-ties or by tying the lead shank), the person moves actuating rod 18 to the forward position by pushing forward on lever 22. As the rod moves to its forward position, its back end edge is cleared from under arm member 12 which is thereby released to rotate downwardly as indicated in FIG. 2.

In order to limit rotation of arm 12 to a horizontally extending configuration, stop means are provided on the trailer for "catching" the free end of the falling arm member at about the same height above the trailer floor as pivotal connector 13. For this purpose, a rubber or foam rubber pad 24 is affixed to the top of the centerboard 26 of the trailer. If there is no centerboard, pad 24 may be mounted to the top of a center post or the like secured to the floor of the trailer. For a one-horse trailer, stop pad 24 could be attached to a suitable support member (not shown) mounted to the wall opposite that to which pivotal connector 13 is mounted. If stop 24 is large, it may be advisable to mount it by hinges or the like so that it can be moved out of the way when the horse is being unloaded.

Stop pad 24, of course, is located in the same vertical plane as that defined by the rotation of restraining arm 12 and is of sufficient size to catch the falling arm. It should also be sufficiently soft to muffle any noise generated by the impact of the falling arm member, since horses are startled by unexpected loud noises, particularly noises from behind, and could be injured by rearing up in the confines of the trailer.

By enabling a person both to lead the horse onto the trailer and to cause the restraining arm to become positioned behind the horse after it is on the trailer, the task of loading the horse can be carried out by just one person. Thus, once restraining arm 12 extends horizontally behind the horse (FIG. 3), the person can go to the rear of the trailer and put up the tailgate or load the next horse on the trailer without worry that the first horse might escape. Moreover, restraining arm 12 can take the place of the usual guard chain used on most conventional trailers.

As preferably embodied, pivotal mounting member 13 is adapted to prevent the bar from inadvertently rotating the wrong way or from possibly being suspended in a vertical configuration even after rod 18 is moved to the forward position. To this end, an abutment member (indicated at 28) is either formed as part of pivotal mounting member 13 or is simply attached to the exterior of the trailer wall structure to hold bar 12 at a relatively small acute angle ($\alpha$ in FIG. 1) with respect to the vertical. Thus, when arm 12 is retained between abutment 28 and rod 18, it is inclined slightly towards stop pad 24 to ensure that after actuating rod 18 has been moved to its forward position, arm 12 will fall towards the catch pad 24 due to its own weight and its angular inclination.

As here embodied, abutment member 28 is formed by a portion of mounting member 13, which projects rearwardly so its back surface is rearward of the front surface of arm 12 and preferably somewhat co-planar with the back surface of bar 12. A notch-like recess 30 is formed in the projecting portion to provide an abutment surface 32 against which the upper side edge (indicated at 12a) of arm 12 abuts when the arm member is rotated to its vertically upward orientation (FIG. 1).

To facilitate attachment of slidable actuating rod 18, particularly when it is to be installed on an existing trailer, pivotal connector 13 is mounted either to the outside surface of wall structure 14 or to its back end edge. It may be necessary, however, to remove a very small section of the back edge of wall 14 to attach arm 12 and connector 13 so that they do not interfere with the latching mechanisms of the tailgate. Alternatively, a small portion of the tailgate may have to be cut away and the tailgate latching means may have to be relocated slightly in order to accommodate pivotal connector 13; arm 12 can be attached to connector 13 in gooseneck fashion so that it does not interfere with any portion of the tailgate. Stop members 42a and 42b (FIG. 5) may be formed on wall 14 to limit slidable travel of rod 18 which, as shown in FIG. 7, may be slidably housed in a recess 44 formed in side wall 14 by slide supports 20'.

In order to remove the horse from the trailer, the person unties the horse at the front and, leaving arm 12 in its horizontal configuration, moves to the back of the trailer. There, the person can lower the tailgate (or any other guard) and raise the arm 12 and pull rod 18 back by trigger 23 for holding arm 12 in the vertically upward configuration. The person can then reach in the trailer and urge the horse to back off the trailer, catching the halter or lead line as the horse moves by.

In an exemplary embodiment, restraining arm 12 may be at least about $\frac{1}{2}''$ wide and about 3/16'' to about $\frac{1}{4}''$ thick, and preferably formed with rounded edges and corners to avoid any possibility of injuring the horse. Slidable actuating rod 18 may be about $\frac{1}{2}''$ to about $\frac{3}{4}''$ wide, about $\frac{1}{4}''$ thick and over approximately 6' long (depending on the length of the trailer). All the structures of the device are preferably made from steel or other suitable metal for strength and durability. However, certain parts, such as arm 12, could be made of wood for low cost.

Figure 6:
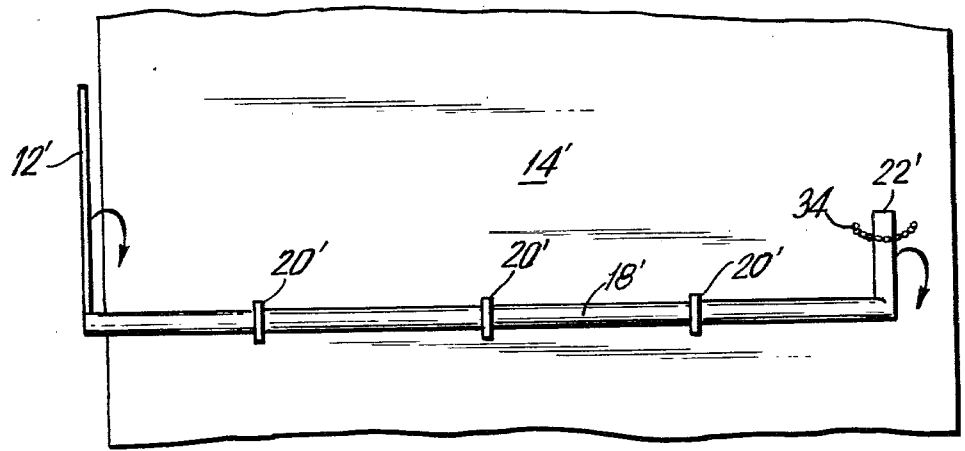
FIG. 6 is a view similar to FIG. 5, showing another embodiment of the invention.

Turning now to FIG. 6, there is shown a side elevation of part of wall structure 14, on which an alternate embodiment of the invention is installed. According to the alternate embodiment, actuating rod indicated at 18' (is rotatably mounted to wall 14' by bearing support 20' and the restraining arm indicated at 12') is fixedly attached to the back end of rod 18'.

Handle means in the form of arm-like lever 22' is fixedly attached to the front end of rod 18', preferably extending generally parallel to restraining arm 12' to provide a ready indication of the orientation of arm 12'. A chain or other retaining member (34) is attached to wall structure 14' for retaining handle 22' (and, therefore, arm 12') in the upright position.

In operation, lever 22' is rotated to the upright position and secured in that position by retaining member 34 so that arm 12' also extends upright substantially similar to arm 12 in FIG. 1. The horse is then led onto trailer 10 in the usual way, as explained above with references to FIGS. 1–5.

Once the horse is in the appropriate position, the person releases catch 34 and grasps lever 22', rotating it about 90° until the free end of bar 12' rests on a stop member (not shown) which may be essentially identical to the stop pad 24 described above with reference to FIGS. 1-5. Restraining arm 12' thereby extends horizontally across the stall space behind the horse, enabling the person to leave the trailer and either close the tailgate or load the next horse.

When the horse is to be unloaded, the person can release the tailgate and any other guards from behind the horse and move to the front of the trailer without fear that the horse will escape. After untying the horse, the person can rotate lever 22' toward wall structure 14' to return restraining arm 12' to its vertical orientation. Handle 22' can thereafter be locked in that position by catch member 34 and the horse backed off the trailer in the usual way.

It will be appreciated by those skilled in the art that the invention is not limited to the specific embodiments herein shown and described. For example, a cable slidable within a hollow sheath may be used instead of a rod for actuating member 18 or a channel-like recess may be formed in wall 14 for accommodating slidable installation of rod 18. Also, a lock mechanism may be used to hold the free end of the restraining arm against the catch pad and, projections may advantageously be attached to rod 18 so as to limit travel of the rod by, for example, abutting a slide bracket 20.

Thus, variations may be made, which are still within the scope of the accompanying claims and within the spirit of the invention.

What is claimed is:

1. An improved transport device for horses or other animals, having a floor support, a wall structure upstanding therefrom and a wheel assembly providing mobility for the device, the wall structure adapted to provide an opening to permit loading and unloading of a horse and to provide at least one stall space for a horse, wherein the improvement comprises:

restraining means associated with each stall space and located generally at the back end of the stall space, each said restraining means being movable between a first posture permitting the horse to be led into the stall space and a second posture positioned generally behind the horse's rump when the horse is standing in the stall space, each said restraining means comprising a restraining arm member mounted generally at one end to the device for rotation between said first and second postures, said arm member being sufficiently long to extend generally the width of the stall space and being adapted to extend generally parallel to the floor support when in said second posture and to extend generally vertically when in said first posture;

actuating means mounted to the device in operative association with each said restraining means, said actuating means being operable at a location remote from said restraining means and adapted to permit movement of said restraining means from said first posture to said second posture, each said actuating means comprising a relatively elongate rod member slidably mounted to the device and extending generally from its back end generally to the front end of the stall space, said rod member adapted to be moved between a rearward position whereat said rod member retains said restraining arm member in said first posture and a forward position permitting release of said arm member to permit said arm member to rotate under its own weight; and stop means positioned at generally the same height relative to the floor support and generally same back-to-front location as the mounted end of said restraining arm member, said stop means adapted to receive the free end of said restraining arm member when in its said second posture to support said restraining arm member essentially horizontally behind a horse in the stall space, such that when said restraining means is in said first posture, a horse can be led onto the trailer by one person and, after positioning the horse in the desired location in the stall space, the person operates said actuating means to cause said restraining means to move from said first posture to said second posture generally behind the horse for substantially preventing backward movement by the horse.

2. A device according to claim 1, wherein said arm member is in said first posture when it extends generally vertically upwardly from its rotatably mounted end.

3. A device according to claim 2, further including handle means at the front end of said rod member to facilitate slidably moving said rod from the front of the stall space.

4. A device according to claim 3, further including additional handle means formed at the back end of said rod member, said additional handle means facilitating rearward slidable movement of said rod for retaining said arm member in said first posture.

5. A device according to claim 2, which further includes block means mounted adjacent the pivotal connection of said arm member, said block means adapted to limit rotation of said arm member from said second posture to said first posture, such that when said restraining arm member is retained between said actuating rod and said block means, said arm member is inclined, relative to the vertical, slightly towards said second posture to ensure that said arm member rotates under its own weight when released by said rod member.

6. A device according to claim 5, wherein said rod member is attached to the wall structure by slide support means which generate essentially no sound during slidable movement of said rod member, and wherein said stop means provides a generally soft landing area to catch the free end of said arm member.

7. A device according to claim 2, further including bias means operably associated with said arm member, said bias means adapted to urge said arm member to said second posture when said arm member is retained in said first posture.

8. A device according to claim 2, wherein said device is a horse trailer adapted to be coupled to the back of a motor vehicle and wherein said arm member and said rod are mounted to a wall portion of the trailer.

9. A device according to claim 8, wherein said rod is mounted to the trailer wall portion by brackets adapted to permit slidable movement of said rod.

10. A device according to claim 8, wherein the trailer wall portion is formed with a channel-like recess adapted to contain said rod and permit slidable movement of said rod therein.

11. A device in accordance with claim 9 or 10, further including stop means for limiting slidable travel of said rod to prescribed limits.

12. An improved transport device for horses or other animals, having a floor support, a wall structure upstanding therefrom and a wheel assembly providing mobility for the device, the wall structure adapted to provide an opening to permit loading and unloading of a horse and to provide at least one stall space for a horse, wherein the improvement comprises:

restraining means associated with each stall space and located generally at the back end of the stall space, each said restraining means being movable between a first posture permitting the horse to be led into the stall space and a second posture positioned generally behind the horse's rump when the horse is standing in the stall space, each said restraining means comprising a restraining arm member mounted to the device for rotation between said first and second postures, said arm member being sufficiently long to extend generally the width of the stall space and being adapted to extend generally parallel to the floor support when in said second posture and to extend generally vertically when in said first posture; and actuating means mounted to the device in operative association with said restraining means, said actuating means being operable at a location remote from said restraining means and adapted to permit movement of said restraining means from said first posture to said second posture, each said actuating means comprising a relatively elongate rod member rotatably mounted to the device and extending generally from its back end generally to the front end of the stall space, said restraining arm member being fixedly mounted to the back end of said rod member for rotation with said rod member, said rod member including means generally at its front end for enabling rotation of said arm member when desired; such that when said restraining means is in said first posture, a horse can be led onto the trailer by one person and, after positioning the horse in the desired location in the stall space, the person operates said actuating means to cause said restraining means to move from said first posture to said second posture generally behind the horse for substantially preventing backward movement by the horse.

13. A device according to claim 12, which further includes stop means adapted to retain said arm member generally parallel to the floor support when said arm member is rotated to said second posture.

14. A device according to claims 12 or 13, wherein said device is a horse trailer adapted to be coupled to the back of a motor vehicle and wherein said arm member and said rod are mounted to a wall portion of the trailer.

15. A method for enabling one person to load a horse, or other animal, onto a transport device, comprising the steps of:

leading the horse onto the device and positioning the horse in the desired location in a stall space on the device; and causing, from the front of the stall space, a restraining arm member located generally at the back end of the device to move behind the horse, generally at about the level of the horse's rump, by causing the arm member to rotate from a generally vertically extending orientation to a generally horizontally extending orientation; and positioning catch means on the device to prevent rotation of the arm member beyond a predetermined point, such that when the horse tries to back up it is essentially restrained from further backward movement by said arm member.

16. A method for enabling one person to load a horse, or other animal, onto a transport device, comprising the steps of:

leading the horse onto the device and positioning the horse in the desired location in a stall space on the device; and causing, from the front of the stall space, a restraining arm member rotatably mounted generally at the back end of the device to move behind the horse, generally at about the level of the horse's rump, by moving an elongate actuating member from a rearward position whereat the arm member is retained in a generally vertically upwardly extending orientation to a forward position whereat the arm member is free to rotate under its own weight to a generally horizontally extending orientation, such that when the horse tries to back up it is essentially restrained from further backward movement by said arm member.

17. A method for enabling one person to load a horse, or other animal, onto a transport device, comprising the steps of:

leading the horse onto the device and positioning the horse in the desired location in a stall space on the device; and causing, from the front of the stall space, a restraining arm member located generally at the back end of the device to move behind the horse, generally at about the level of the horse's rump, by rotating an elongate actuating member to which the arm member is fixedly attached to change the orientation of the arm member from a generally vertically upwardly extending orientation to a generally horizontally extending orientation, such that when the horse tries to back up it is essentially restrained from further backward movement by said arm member.

* * * * *

UNITED STATES PATENT AND TRADEMARK OFFICE
CERTIFICATE OF CORRECTION

PATENT NO. : 4,355,594

DATED : October 26, 1982

INVENTOR(S) : Mary H. Wagner

It is certified that error appears in the above-identified patent and that said Letters Patent is hereby corrected as shown below:

In the drawings:   Add Figure 7 as shown on the attached sheet.

Signed and Sealed this

Twenty-fifth Day of October 1983

[SEAL]

Attest:

GERALD J. MOSSINGHOFF

Attesting Officer     Commissioner of Patents and Trademarks

UNITED STATES PATENT AND TRADEMARK OFFICE
CERTIFICATE OF CORRECTION

PATENT NO. : 4,355,594

DATED : October 26, 1982

INVENTOR(S) : Mary H. Wagner

It is certified that error appears in the above-identified patent and that said Letters Patent is hereby corrected as shown below:

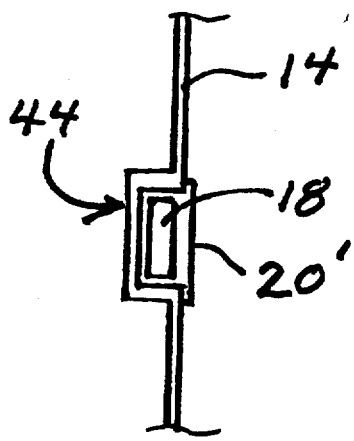

FIG. 7